July 18, 1939.     H. C. EVELYN     2,166,657
FLASHLIGHT DEVICE
Filed April 22, 1938
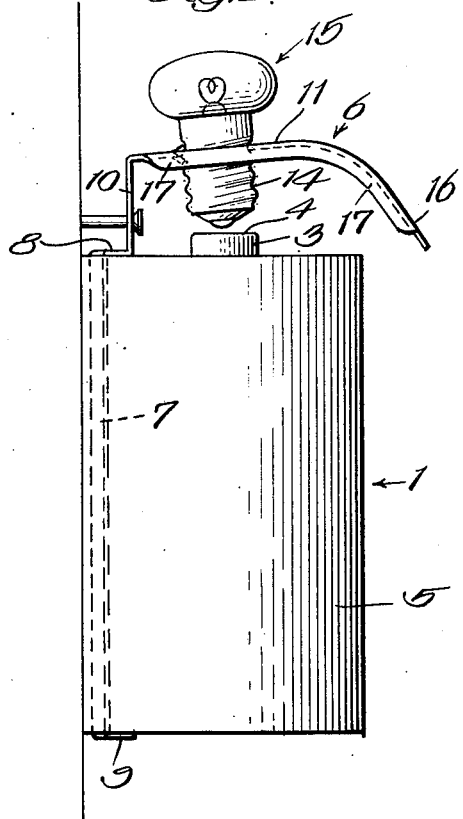

Patented July 18, 1939

2,166,657

UNITED STATES PATENT OFFICE 2,166,657

FLASHLIGHT DEVICE

Harry C. Evelyn, Chicago, Ill.

Application April 22, 1938, Serial No. 203,582

3 Claims. (Cl. 240—10.61)

This invention relates to flash-light devices, and more particularly pertains to such devices employing dry-cell batteries.

The main object of the invention is to provide such a device of the simplest construction; that may be manufactured very cheaply, and that will not be liable to get out of order.

More particularly, the object of the invention is to provide a flash-light device comprising a dry-cell battery, an electric lamp, and a single bracket element connecting same in such a manner as to provide uninterrupted circuit-continuing means therebetween, and that will serve as switching means for the lamp.

Other objects and advantages will become apparent by reference to the specification and the accompanying drawing, in which:

Fig. 1 is a side elevation of the flash-light device embodying one form of the invention.

Fig. 2 is a view similar to Fig. 1 with some parts in section and other parts in changed position.

Fig. 3 is a plan view of the device with the lamp removed.

Fig. 4 is a perspective of the bracket element of the invention.

In carrying out one form of the invention, the device as illustrated includes a common type of electric battery, or dry-cell battery 1. This type of battery usually comprises a cylindrical metallic receptacle 2 containing an electrolyte or galvanic compound. Mounted centrally in the receptacle is the anode or positive terminal 3 of the battery, with said terminal projecting slightly beyond the top of the receptacle and having a flat top or contact surface 4. In this type of battery, the receptacle serves as the cathode or negative terminal.

The type of battery shown is also provided with a protecting casing 5 in the form of a tubular section of insulating material, such as cardboard, within which the receptacle 2 is frictionally held in such a manner that it may be removed therefrom.

In accordance with the main object of the invention, a single bracket element 6 is provided for supporting an electric lamp in cooperative relation with the terminal 3; that will serve as a conductor between the battery and the lamp; and that will serve as a switch for the lamp. Said element 6 is formed from an elongated piece, or flat strip, of resilient metal, such as spring material. The bracket is provided with an elongated battery terminal-engaging portion 7 formed arcuately in cross-section and adapted to be snugly confined, so as to extend between, the receptacle 2 and the casing 5 of the battery, for effecting a substantial electric connection between the battery and the bracket.

The bracket 6 continues from its portion 7 at right angles over the edges of the battery receptacle 2 to provide battery top-engaging and battery bottom-engaging portions 8 and 9, respectively, to form a battery-receiving recess within which the battery is firmly held by the casing 5, and whereby the bracket is firmly held in assembly with the receptacle.

The bracket continues from its portion 8, upward from the top of the battery, into a flat flexible portion 10, and then continues over the top of the battery into a substantially rigid lamp supporting portion 11 having a lamp socket formation or threaded aperture 12 for receiving the threaded base 14 of a common type of electric lamp 15 so that the end terminal of the lamp is normally slightly above the terminal 3 of the battery. By virtue of the resiliency of the portion 10 of the bracket, it serves as a pivot for the lamp supporting portion 11 to cause contact between the end terminals of the battery and lamp when said portion 11 is depressed. The portion 11 is so arranged that the lamp will be coaxially disposed with respect to the battery when in contact therewith, as seen in Fig. 2.

To enable an operator to conveniently operate the device with the same hand that it is held in, the portion 11 of the bracket continues arcuately downward toward the battery into a finger or thumb-engaging portion 16, with said portions having side flanges 17 rendering same substantially rigid with respect to each other.

For causing the portion 10 of the bracket to flex at a point near or in the plane of the top end of the battery terminal 3 when the portion 11 is depressed, in order to cause the end terminal of the lamp to squarely engage the said battery terminal, said portion 10 is provided with an aperture 18 to slightly weaken same at this point. It may be mentioned that the aperture 18 in the bracket may be made large enough to receive a hook or a nail so that the device may be hung upon a wall or any other suitable place when not in use, as seen in Fig. 1.

By virtue of the structure described, a flashlight device has been provided that is very simple in construction, easy to assemble or take apart, and that comprises but one element besides the ordinary battery and lamp usually employed in devices of the same class.

Having thus described my invention, I claim:

1. In a device of the class described, the combination with an electric battery including a cylindrical battery receptacle forming a battery terminal with the other terminal of the battery arranged centrally at the top end of the receptacle and a tubular casing within which the receptacle is snugly confined, of a bracket element formed of a single piece of resilient strip metal having a part shaped to be confined between the receptacle and the casing with other parts formed angularly from said part and arranged to engage the top and bottom ends of the receptacle respectively for holding the element in position on the receptacle, and the element having another part continuing from one of its angular parts in spaced relation over the top end terminal of the battery arranged to be flexed theretoward with a formation therein to support an electric lamp so that one of its terminals will engage the end terminal of the battery when said part is flexed toward said terminal.

2. A lamp-supporting bracket for an electric battery having a cylindrical battery receptacle forming a battery terminal with the other terminal of the battery arranged centrally at the top end of the receptacle and a tubular casing within which the receptacle is snugly confined, wherein the bracket is formed of a single piece of resilient strip metal having a part shaped to be confined between the receptacle and the casing with other parts formed angularly from said part and arranged to engage the top and bottom ends of the receptacle respectively for holding the bracket in position on the receptacle, and wherein the bracket has another part continuing from one of its angular parts arranged to extend in spaced relation over the top end terminal of the battery and adapted to be flexed theretoward with a formation therein to support an electric lamp so that one of its terminals will engage the end terminal of the battery when said part is flexed toward said terminal.

3. The structure as defined in claim 2, wherein the bracket has an end part extending angularly from said lamp supporting part so as to project toward the battery and adapted to be engaged by a finger or thumb of an operator so that the lamp supporting part may be conveniently operated by the same hand of the operator holding the battery.

HARRY C. EVELYN.